L. R. ROBERTS.
AUTOMATIC TYPE WRITER OPERATOR.
APPLICATION FILED SEPT. 5, 1914.
1,182,508.
Patented May 9, 1916.
4 SHEETS—SHEET 4.
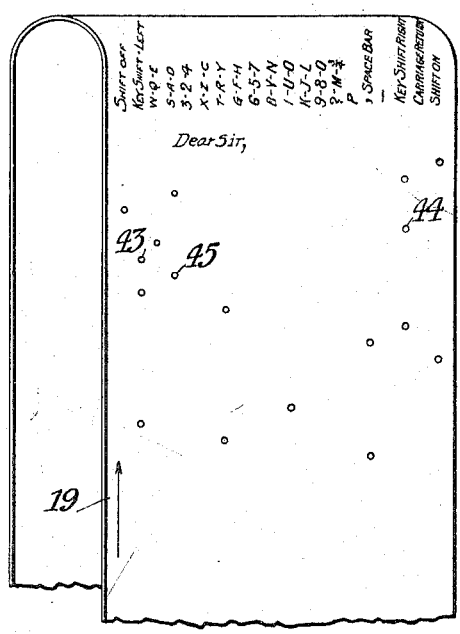
Fig.6.
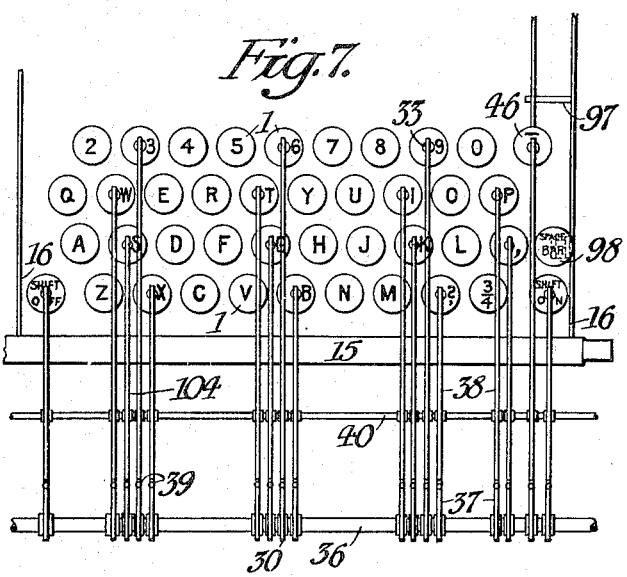
Fig.7.
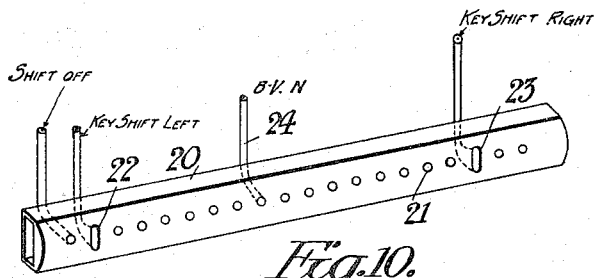
Fig.8.
Fig.10.
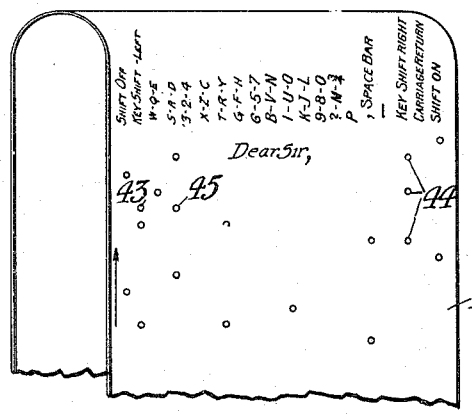
Fig.9.
WITNESSES
E. A. Rennie
W. C. Westphal
INVENTOR
Lyman R. Roberts
BY
C. B. Stickney
ATTORNEY

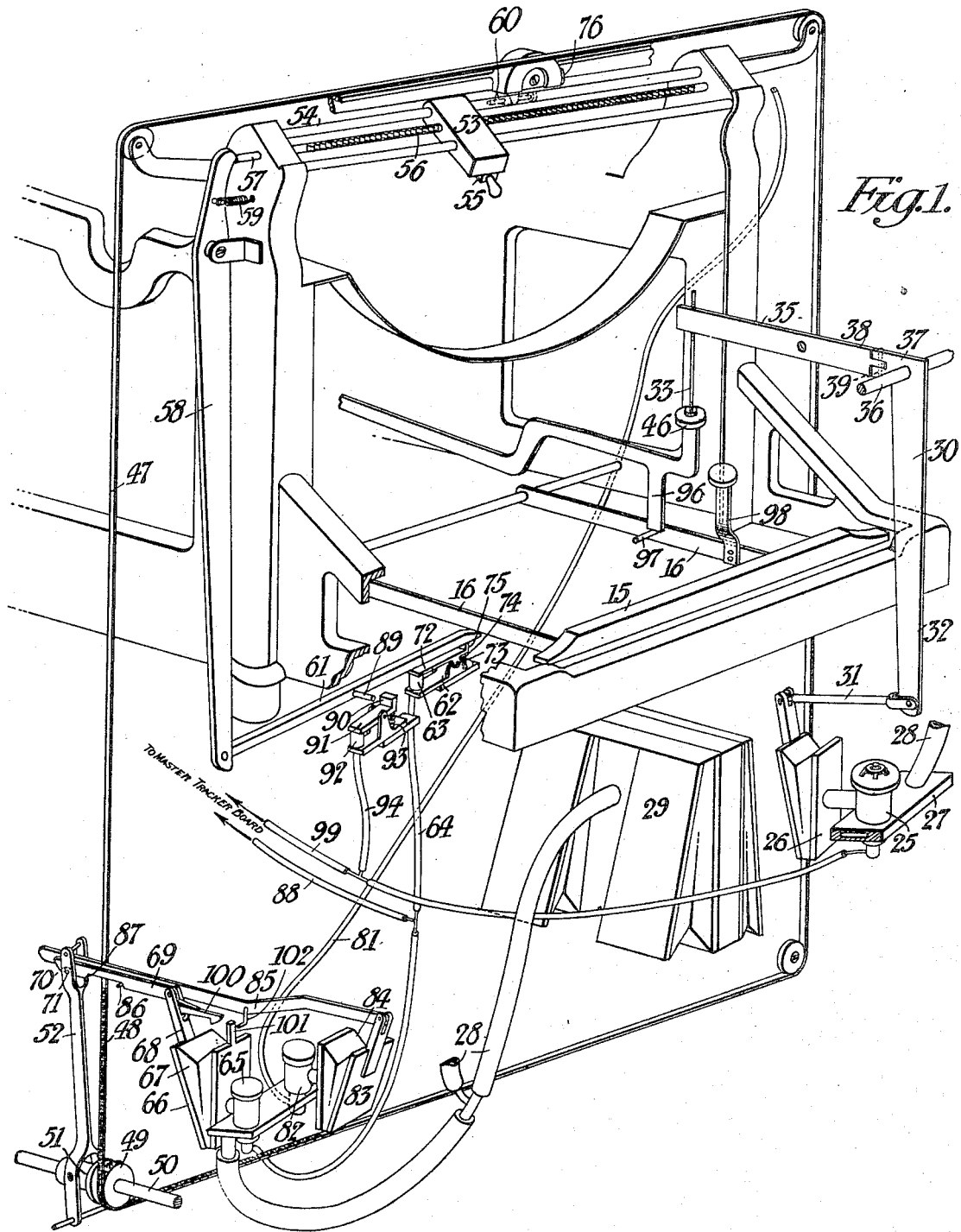

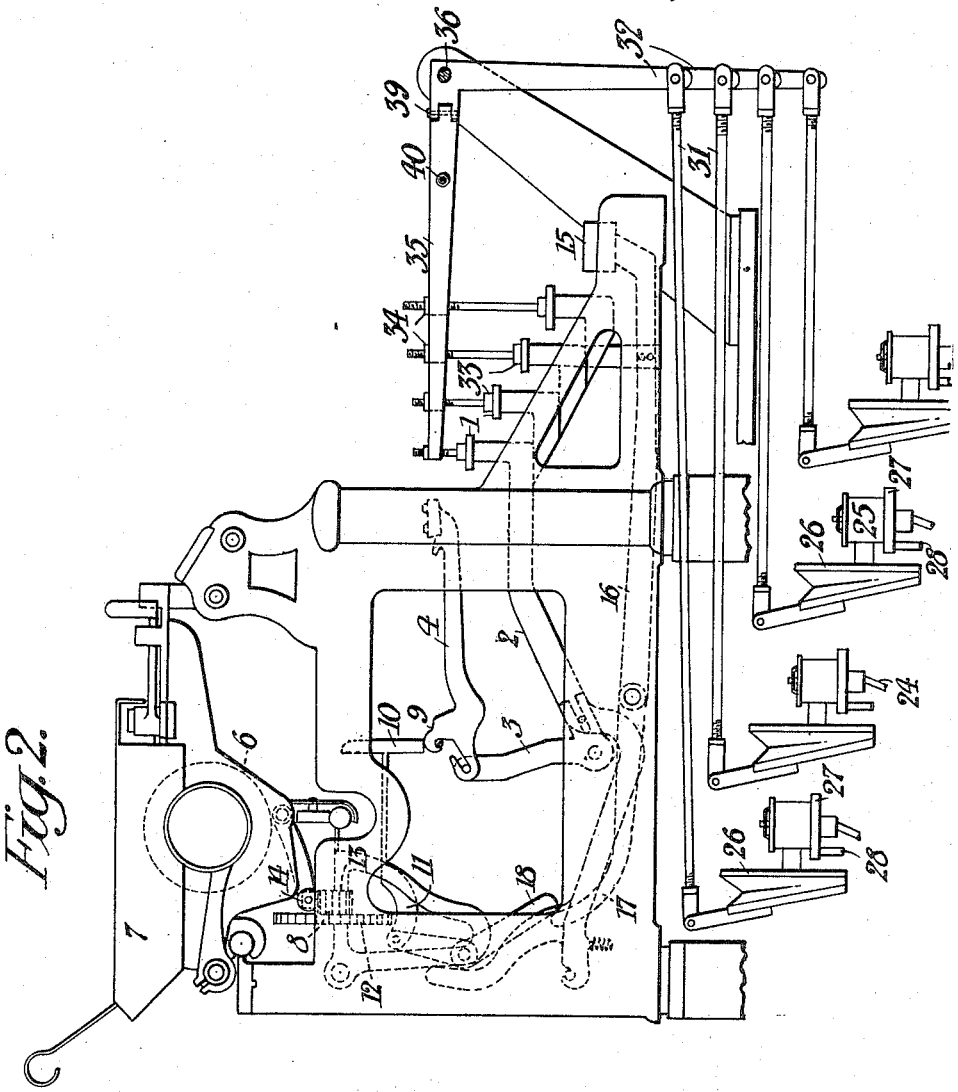

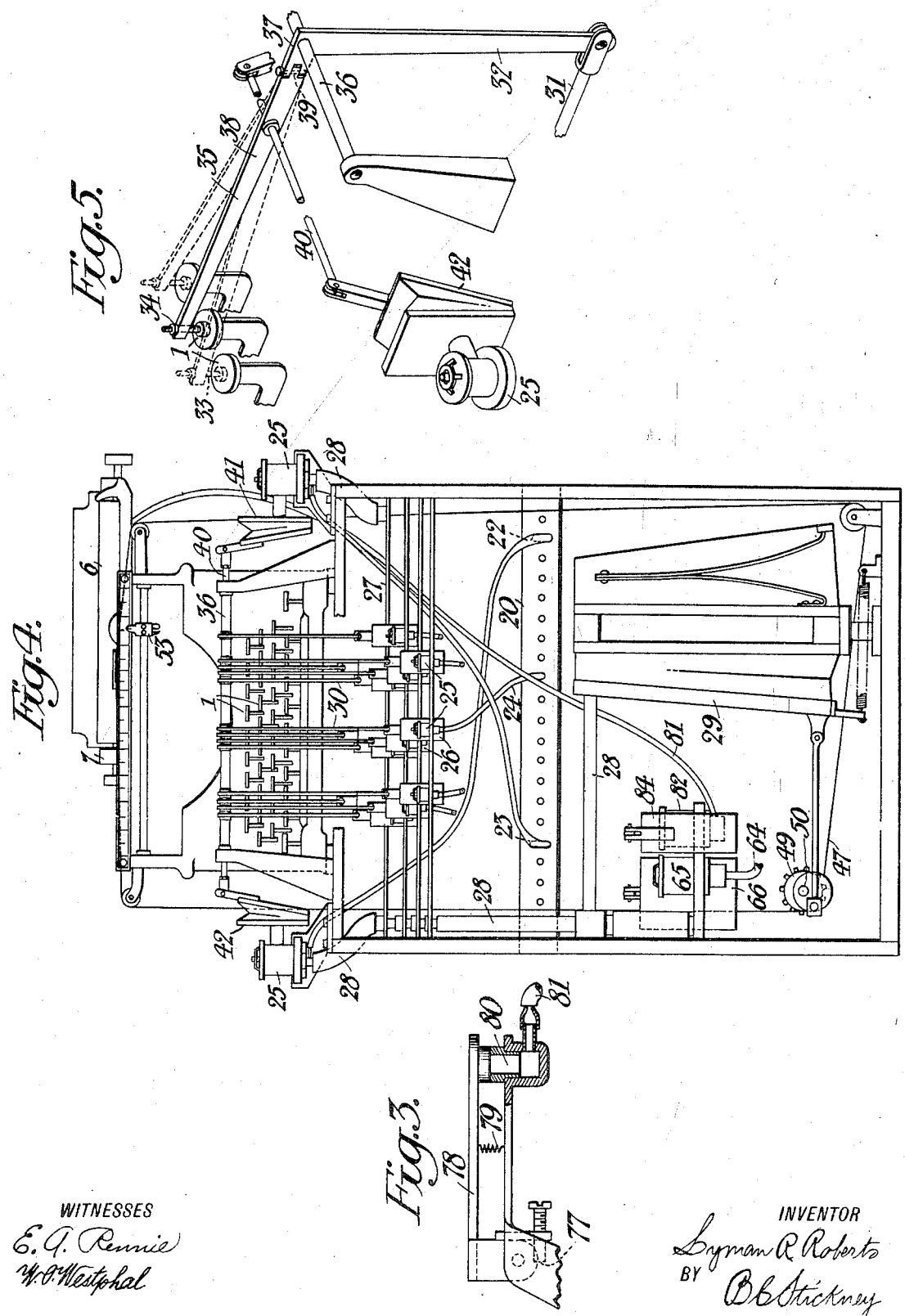

UNITED STATES PATENT OFFICE.

LYMAN R. ROBERTS, OF RUTHERFORD, NEW JERSEY, ASSIGNOR TO UNDERWOOD TYPEWRITER COMPANY, OF NEW YORK, N. Y., A CORPORATION OF DELAWARE.

AUTOMATIC TYPE-WRITER OPERATOR.

1,182,508.          Specification of Letters Patent.          Patented May 9, 1916.

Application filed September 5, 1914. Serial No. 860,322.

*To all whom it may concern:*

Be it known that I, LYMAN R. ROBERTS, a citizen of the United States, residing in Rutherford, in the county of Bergen and State of New Jersey, have invented certain new and useful Improvements in Automatic Type-Writer Operators, of which the following is a specification.

This invention relates to an automatic operator, and more especially one adapted to actuate the parts of a typewriter, and is an improvement on my application No. 806,408, filed December 13, 1913.

An object of the present invention is to decrease the number of parts necessary to make a perfect automatic operator, and also to decrease the size of the master member which controls the automatic action of the operator.

In the application above mentioned to which reference may be had for parts omitted in the present disclosure, there are provided a series of pneumatic actuators which operate the various parts of a typewriter including the keys. These actuators are controlled from a perforated master sheet whose perforations come in register with a tracker board connected to the actuators so as to cause successive operations of the various actuators corresponding to representation of written matter perforated in the master sheet. This then will give a reproduction in typewriting to correspond with the typewriting matter predetermined, and as often as the master sheet is run through the machine. In said application, each numeral key has a pneumatic actuator individual to itself. In the present machine, however, one actuator is made to serve a number of keys, generally three, so that the number of actuators is greatly diminished. To accomplish this, each actuator has a striker which may occupy any one of three positions, each one of which is generally in coöperation with a different key of the typewriter. The several positions of all of the strikers are controlled from a pair of balanced shifting actuators, which are controlled in turn from the master sheet the same as the other actuators. The shifting actuators come into play first, so as to position the strikers, and then the operating actuator comes into play to cause a striker to depress the key with which it happens to be brought in register. The shifting actuators move the strikers from an intermediate position over one set of keys to a position, on one hand to the right, over another set of keys, and on the other hand to the left, over still another set of keys. We may thus have a shifting actuator brought into play with the concomitant, although not quite simultaneous, bringing into play of a striker actuator, whereby a key will be selected and then struck. This sometimes necessitates two perforations in the master sheet for the striking of a single key, provided the striker which dominates that particular key is not in superposed relation thereto when in a neutral position. Inasmuch as each striker actuator controls the striking of three keys, the number of corresponding different perforations would be about one-third the number of keys, so that the width of the master sheet need not be very great.

Another object of the invention is to render the carriage-return mechanism which brings the typewriter carriage back to start a new line, subservient to the space key or bar and to the hyphen key, solely, however, at the end of a written line as determined by the carriage. This enables the carriage, in effect, to control its own return movement, and, at the same time, enabling the striking of either the space key or the hyphen key at the end of a line, as at the finishing of a line, to cause a return movement of the carriage. To do this, a control valve for the carriage-return mechanism is placed subservient to a tripper, which is normally ineffective, but as the carriage approaches the end of a line as determined by an adjustable stop, it forces the tripper to a position subservient to the space bar or key. The space bar is in turn rendered subservient to the hyphen key, so that if either the hyphen key or the space bar is struck at the end of a line, the controlling valve for the carriage-return mechanism would be opened to cause the carriage to be returned.

Other features and advantages will hereinafter appear.

In the accompanying drawings Figure 1 is a skeleton perspective view showing details of the mechanism with one of the striker actuators in a neutral position, and disclosing certain details of the carriage-return mechanism. Fig. 2 is a view in elevation, partly in section, taken from front to rear, showing the arrangement of the various actuators for the keys of the typewriter. Fig. 3 is a detail view of the valve which controls the throwing out of the carriage-return mechanism at the end of the carriage return. Fig. 4 is a front view in elevation showing the relation of the various parts of the operator to the typewriter. Fig. 5 is a detail perspective view showing in full lines the intermediate neutral position of a striker, and in dotted lines the two side positions thereof, whereby a single striker is made to dominate three keys. Fig. 6 is a fragmentary perspective view of a master sheet in which the shifting actuators are controlled slightly in advance of the striker actuators by placing the perforation which governs the shifting actuator slightly in advance of the coöperating perforation which controls the striker actuator for the writing of a single character or letter. Fig. 7 is a top plan view of the keyboard and the relation of the various striker actuators thereto. Fig. 8 is a perspective view of a tracker board to be used in connection with the master sheet shown in Fig. 6, in which the apertures connected to the actuators which control the shifting from right to left of the strikers are arranged with their lower edges in alinement with the other apertures. Fig. 9 is a fragmentary perspective view of another type of master sheet in which the perforations which control the shifting to the right or left of the series of striker actuators, by means of the shifting actuators, are placed in horizontal alinement with the coöperating perforations which control the operation of the striker actuators. The shifting actuators come into play in this instance also in advance of the striker actuators. Fig. 10 is a perspective view of a tracker to be used in connection with the master sheet shown in Fig. 9, and illustrates the advancing of the apertures in the tracker for the shifting actuators, whereby although the perforations in the master sheet corresponding thereto are in alinement with the striker-actuator perforations, the shift to the right or left actuator may come into play slightly sooner.

Indicating briefly the parts of the typewriter *per se*, character keys 1 depress, when actuated, key-levers 2, to rock bell cranks 3 to swing type-bars 4 up rearwardly against the front side of a platen 6 mounted on a carriage 7. The carriage 7 travels step by step under the pull of a spring barrel, not shown, and under the control of an escapement mechanism indicated in general at 8. Each type-bar as it swings up to strike the platen, forces a heel 9 into engagement with a universal bar of a universal frame 10, which rocks a pair of dogs 11 forming part of the escapement mechanism, and coöperating with an escapement wheel 12 having a pinion 13 secured thereto which meshes with a rack 14 carried by the carriage 7. A space key or bar 15 also spaces the carriage 7 a letter space without the printing of a character, by depressing a frame 16, which has an extension 17 engaging an arm 18 secured to the universal frame 10, whereby the same is operated together with the dogs 11.

In order to actuate the various parts of the typewriter automatically, the master sheet 19, which may be of the character shown in either Fig. 6 or Fig. 9, is fed in the manner illustrated in my application No. 806,408, past a tracker 20, which may be either of the form shown in Fig. 8 or of the form shown in Fig. 10. The tracker 20 has a series of apertures 21, which may be called the striker apertures, and two shift apertures 22 and 23. To each of these apertures there is connected a conduit 24, which may be of any suitable type, preferably flexible rubber tubing, which is connected at its opposite end to a controller 25 (Figs. 1 and 2) of a pneumatic actuator. The controller in each instance may be of the character shown in my application above mentioned, and the details thereof need not be described except to say that as soon as a perforation in the master sheet 19 comes in register with an aperture in the tracker-board 20, it admits air to this aperture and thus to the conduit 24 connected thereto, which in turn admits air to the controller 25. This controller 25 is so arranged that when air is admitted to a certain chamber thereof, it will connect a pneumatic motor 26 to a source of suction indicated at 27. This source of suction may be provided in any suitable manner by connecting the chamber 27, which is illustrated as the source of suction, by means of a conduit 28, to a vacuum pump 29 operated by any suitable source of power. The controller 25 and the motor 26 form parts of a pneumatic actuator, the motor 26 forming the source of power necessary to do the effective work thereof.

For striking the keys 1 of the typewriter, there may be provided actuators 30, which may be called striker actuators. Each of these striker actuators 30 includes, in addition to the controller 25 and the motor 26, a link 31 connected to be thrust on by the motor 26 when the latter is collapsed, whereby it will in turn rock a bell crank 32. One arm of the bell crank 32 is provided with a striker 33, which is arranged to engage and depress whatever key it happens to be superposed on. The strikers 33 may be adjustable with respect to their bell cranks 32, by a screw-thread and lock-nut arrangement 34 to give accuracy of action.

As has been stated above, each striker generally controls more than one key, and generally three keys. For this purpose, one arm 35 of each bell crank 32 is adjustable sidewise, that is, transverse to the axis 36 of swinging of the bell crank. This is brought about by making the arm 35 of the bell crank 32 in two sections 37 and 38, the former rigid with the pivotal portion of the bell crank, and the latter hinged at 39 to the rigid portion. The swinging or hinged portion 38 of each bell crank is secured to a shift rail 40, whereby when this shift rail is moved from an intermediate neutral position to the right, all of the strikers will be moved to the right, and contrariwise, when the shift rail 40 is moved to the left, all of the strikers will be moved to the left, as illustrated in Fig. 5.

The shift rail 40 is moved to the right by a shifting actuator 41, and the rail is moved to the left by a shifting actuator 42. These shifting actuators each include the usual motor 26 and controller 25 therefor. The actuators 41 and 42, however, are opposed in the direction of their action, that is to say, they pull in opposite directions. Inasmuch as the motors 26 thereof are provided with the usual internal expansion springs whereby they assume a normal extended condition at a collapsing action, the shift rail 40 and the swinging portions 38 will normally rest at intermediate neutral positions when neither of the shifting actuators is in operation. The shift-to-the-right actuator 41 is controlled from the apertures 23 in the tracker board 20, while the shift-to-the-left actuator 42 is controlled from the aperture 22 in the tracker-board 20.

It will be noted that the apertures 22 and 23 in the tracker board 20 shown in Fig. 10, have their lower edges slightly in advance of the lower edges of the apertures 21, so that perforations in the master sheet 19 (Fig. 9) will come into register therewith slightly earlier than the conjunctively-acting perforations for the apertures 21. The reason for this is that it is desired, in case a striker 33 is to be shifted from a neutral position to either side, as illustrated in Fig. 5, that the shifting shall be done before the striker actuator which causes a depression of the striker, comes into play, as the striker must be in position when it is actuated. With this advancing of the apertures 22 and 23, the perforations indicated at 43 and 44 respectively, for the shift-to-the-left and the shift-to-the-right actuators, may be placed in alinement with perforations 45, which come into register with the apertures 21, and control the striker actuators. By this means the length of the master sheet 19 can be very much condensed. The same effect can be obtained, however, as in Fig. 6, by advancing the perforations 43 and 44 slightly ahead of the conjunctively-acting perforations 45. In such an event, the tracker board 20 may be of the form shown in Fig. 8, with the lower edge of the apertures 22 and 23 in register with the lower edge of the apertures 21. It will be further noted that the shifting-actuator-controlling apertures 22 and 23 are slotted, so as to be in action during the period of action of the apertures 21, and, in fact, slightly longer. This prevents the sidewise shifting of the strikers and the arms 35 while in a depressed position, thus enabling them to assuredly clear the keys of the typewriter when shifted sidewise.

It is essential in this type of machine to return the carriage 7 when the end of a line has been reached. This may be controlled from the tracker board by a perforation in the master sheet coming in register with an aperture in the tracker board. It may be also controlled in addition from the carriage itself, with the coöperation of the space bar 15, and some times of the hyphen key indicated specifically at 46. The same general type of carriage return as illustrated in the above-mentioned application may be used in this case, and includes an endless band 47 connected suitably to the typewriter carriage 7, and having a chain 48 in its length driven by a sprocket wheel 49, which may be clutched to the power shaft 50 by a clutching mechanism indicated in general at 51, which includes a shifting lever 52.

To determine the extent of advance movement of the carriage, and hence the length of the line, there is provided a stop 53 adjustably mounted on a bar 54 carried by the typewriter frame, and having a dog 55 to engage in the teeth of a rack bar 56, which teeth are located at letter-space intervals. The rack bar 56 is floatingly mounted in the frame of the typewriting machine, and projects at 57 to engage a shift lever 58, so as to rock the same against the tension of a spring 59.

To effect the shifting of the rack bar 56, there is provided on the carriage 7, an adjustably mounted contact 60, which, when the carriage 7 reaches the end of a line as predetermined by the position of the stop 53, engages the stop 53 to force the rack bar 56 to the left (Fig. 1), thereby rocking the lever 58. The lever 58 when thus rocked, advances an interponent tripper 61 beneath one of the side rails of the frame 16 for the space key or bar 15. That is to say, the tripper 61 is normally clear of the space key 15 and its frame 16, so that the space key or bar can be operated without disturbing the tripper 61 at any point in the body of a written line. However, when the carriage 7 approaches the end of a written line, for example, anywhere within a zone including, say five, letter spaces, at the end of a line, then the tripper will be advanced step by step beneath the frame 16, so that when the space bar or key 15 and its frame 16 are actuated, the tripper 61 will be operated.

The tripper 61 controls the bringing into play of the carriage-return mechanism. To do this, the tripper 61 overlies a control set 62, which includes a nipple 63 connected by a conduit 64 to the controller 65 of a pneumatic actuator 66. This pneumatic actuator includes a pneumatic bellows motor 67 connected by an arm 68 to a shift link 69. The shift link 69 is provided with a notch 70 engaging a pin 71 on the clutch lever 52. The nipple 63 is normally closed by a valve 72, which is shown in the form of a lever pivotally mounted at 73, and normally held closed by a spring 74. This lever has an upstanding lug or riser 75, on which the tripper 61 rests, so that when the tripper 61 is depressed it will rock the valve 72 about its pivot 73, so as to admit air to the nipple 63. This, then, excites the pneumatic actuator 66 to action, causing its bellows motor 67 to collapse, so as to draw on the link 69, thereby shifting the clutch lever 52 to close the clutch 51 against the tension of its spring, and thus connect the sprocket 49 in driven relation with the power shaft 50. A spring-pressed latch 100 on the arm 68 engages a projection 101, so as to maintain the bellows motor 67 collapsed, and the clutch mechanism in its effective position until tripped. The carriage will then be returned by the band 47 until a lug 76 on the carriage comes into engagement with a contact 77 on a valve 78 (Fig. 3), and opens this valve against the tension of spring 79, so as to admit air to a nipple 80. This controlling mechanism is the same as that disclosed in my application above mentioned, and enables the disconnection of the carriage-return mechanism. To do this, the nipple 80 is connected by a conduit 81 (Fig. 1) to a controller 82 for a pneumatic actuator 83, which includes the usual bellows motor 84 joined to a tripper 85. This tripper is provided with a pin 86, which, when the bellows motor 83 is collapsed, will engage a cam edge 87 provided on the under side of the shift link 69, so as to raise the notch 70 out of engagement with the pin 71, thereby permitting the spring of the clutch mechanism 51 to open the clutch, and return the shift lever 52 to a silent position. This then interrupts the connection between the sprocket wheel 49 and the shaft 50, so that the carriage will no longer be driven in a return direction. A pin 102 on the tripper 85 also releases the latch 100 by engaging under the cam end thereof.

In addition to being controlled from the space key or bar 15, the carriage-return mechanism including the pneumatic actuator 66 therefor, may be governed from the tracker board, the conduit 64 having a branch 88 leading to the tracker board. It will be seen, however, that if we have a zone of five letter spaces at the end of a line, in which the tripper 61 may be effective, and if the space key 15 is operated in this zone at the end of the line, then the carriage will be returned. In addition to this, provision is made whereby if a word breaks in the middle at the end of a typewritten line, and has to be hyphenated, the carriage itself will take care of this hyphening, at the same time returning the carriage for a new line. For this purpose the tripper 61 is provided with a pin or projection 89, which, when the carriage arrives at the very last letter space of the written line, will engage an extension 90 on a valve 91, which controls the opening of a nipple 92. The valve 91 will be rocked against the tension of a spring 93, so as to open up the nipple 92, permitting air to rush therein. The nipple is connected by a conduit 94, to the controller 25 for the striker actuator which governs the hyphen (-) key 46. This is the only striker actuator shown in Fig. 1, and in a neutral position the striker 33 thereof is always above the hyphen key 46. This hyphen key in addition to being connected to operate the usual type action to print a hyphen, is provided with a downward extension 96 overlying a pin or projection 97 on one of the side reaches of the frame 16 of the space bar or key 15. It will thus be seen that when the controlling valve 91 is opened, the hyphen striker actuator 30 will be operated to depress the hyphen key 46, and, at the same time, depress the space key 15. Inasmuch as the tripper 61 is already beneath the space key frame 16, the valve 72 will also be opened, so that the carriage-return mechanism will be brought in play. As soon as the carriage returns slightly, the pin 89 will be withdrawn from engagement with the extension 90 on the valve 91, permitting the same to close, so that the hyphen key 46 can return.

In order that the space key or bar 15 may be easily operated, it may be provided with a supplementary key 98 extending up from the frame 16 (Figs. 1 and 7), and controlled by the same striker actuator which operates the comma key. The hyphen-key actuator may also be controlled from the tracker board, as the conduit 94 has a branch 99 extending to the tracker board.

In the operation of the device, the master sheet is perforated previously to correspond with the reproduction of a definite succession of typewriting actions of the typewriting machine to give typewritten matter such as a letter. This master sheet is inserted in the feeding mechanism of the automatic operator, and the machine started. The master sheet may be perforated as in Fig. 6, with the shift perforations slightly in advance of the striker-actuator perforations, in which case a tracker of the type illustrated in Fig. 8 may be used, having the lower edges of the apertures 21, 22 and 23 in alinement with each other; whereas if a more concentrated representation or shorter master sheet is desired, the form shown in Fig. 9 may be used, in which the shift apertures in the tracker will extend slightly below or in advance of the striker-actuator apertures 21, as in the tracker shown in Fig. 10. In either event, the shifting actuators will be brought into play first for each letter requiring a shifting actuator, so that the strikers will be in proper position above the selected keys before their actuators are operated. In the illustration given, a letter is started with the words "Dear Sir". The first perforation at the top will come into play first as the master sheet feeds upward from the front, and this perforation is the shift-on perforation, meaning that the permanent case shift key is struck, so that the first letter, which will be "D", may be written as a capital. A shift-to-the-right perforation 23 will then come into play, so that the shift-to-the-right actuator 41 will move all of the hinged arms 38 to the right, thereby bringing the particular arm 104 in Fig. 7 to the right, so that from a normal position superposed above the "S" key, the striker will be brought above the "D" key. A third perforation on the master sheet will then come into play, which operates the striker actuator for this arm 104, so that the "D" key would be depressed to print the capital letter D. As the master sheet feeds on, the slotted nature of the shift-to-the-right aperture 23 in the tracker 20, enables the arm 104 to remain in its shifted-to-the-right position until it has been returned clear of the "D" key, by which time the master sheet will have passed to bring a blank space opposite to the shift-to-the-right aperture 23, permitting the shift-to-the-right actuator 41 to be silenced, so that the arm 104 with its striker will return to an intermediate neutral position superposed above the "S" key. The shift-off perforation will then come into play to strike the temporary case-shift key, which will release the permanent case-shift key, permitting the return to writing of small or lower-case characters. The action for the other letters is similar for the writing of "Dear Sir", and will take place in the following way: The shift to the right; "e" key striker actuator; the shift to the left; "a" key striker actuator; the shift to the left; "r" key striker actuator; space-bar actuator; shift-on; "S" key actuator; shift-off; "i" key actuator; shift to the left; "r" key actuator, and comma-key actuator. It will be seen from this that some of the letters, such as "D" and "e" require a shift to the right before the bringing into play of the striker actuators; others of the keys, such as "a" and "r" require shifting to the left before their striker actuators come into play, and still others, such as "S" and "i", require no shifting whatsoever before the bringing into play of their striker actuators. This enables one striker actuator to be in dominance over a plurality of keys, and in a majority of cases, over three keys, thereby greatly reducing the number of actuators and allied parts. When the end of a written line is reached, the carriage may be returned by a carriage-return perforation in the master sheet, or it may be returned automatically without the necessity of a carriage-return perforation in case either the space bar or the hyphen key is actuated in a predetermined zone, say of five letter spaces at the end of the line. In a case where a word is split at the very last letter-space in this zone, the hyphen key would be automatically operated from the carriage itself without the necessity of providing a perforation in the master sheet.

Variations may be resorted to within the scope of the invention, and portions of the improvements may be used without others.

Having thus described my invention, I claim:

1. The combination with a typewriting machine including keys and type actions operated by said keys, of an automatic operator for said typewriting machine including a plurality of actuators, some of said actuators serving to operate individually a plurality of said keys and the type actions operated thereby.

2. The combination of a plurality of type actions; a single actuator serving to operate all of said type actions; means for adjusting said actuator so as to enable it to have dominance over said type actions individually and selectively; and master-sheet-controlled mechanism automatically controlling the activity of both of said actuator and of its said adjusting means.

3. The combination of a plurality of type actions; a single actuator serving to operate all of said type actions, said actuator being normally in position to operate one of said type actions; shifting means for adjusting said actuator to position to operate another of said type actions; and master-sheet-controlled mechanism automatically controlling the activity both of said actuator and of its said adjusting means.

4. The combination of a plurality of type actions; a single actuator serving to operate all of said type actions, said actuator being normally in register with an intermediate one of said type actions; shifting means for selectively adjusting said actuator in register with type actions on opposite sides of said intermediate type action, so that said actuator may bring into play selectively any one of said type actions; and master-sheet-controlled mechanism automatically controlling the activity both of said actuator and of its said adjusting means.

5. The combination with a typewriting machine including a plurality of keys, of an automatic operator for said typewriting machine including a plurality of actuators, said actuators being capable of operating all of said keys, each actuator having a capacity of several keys, whereby the number of actuators will be but a fraction of the number of keys.

6. The combination with a typewriter including a plurality of keys, of an automatic operator for said typewriter including a series of actuators having parts adjustable to one of a plurality of zones, whereby said actuators may operate different sets or groups of keys, and shifting means for adjusting parts of said actuators in unison from one zone to another.

7. The combination with a key, of a striker for depressing said key, shifting means for adjusting said striker in register with said key, and actuating means for imparting movement to said striker when in register with the key, to depress said key.

8. The combination with a typewriter including a plurality of keys, of an automatic operator for said typewriter including a selecting actuator for determining a key to be actuated, and a striking actuator for doing the work of striking the key.

9. The combination with a plurality of keys, of an actuator for said keys including a section swinging about one axis to operate said keys, and a section swinging about another axis to determine which of said keys shall be operated by said actuator.

10. The combination with a key, of an actuator for operating said key having a member swinging about one axis to operate said key, with a part of said member swinging about another axis to determine the effectiveness of said actuator to operate said key.

11. The combination with a plurality of keys, of a striker for said keys having a transverse selecting movement and a longitudinal actuating movement.

12. The combination with a plurality of keys, of a striker for said keys, and a pivotally-mounted jointed bell crank for enabling said striker to move in two directions at right angles to each other.

13. The combination with a plurality of keys, of a plurality of actuators for said keys, said actuators being less in number than said keys, and selecting actuators operable in conjunction to said first-mentioned actuators to determine which of said keys may be actuated.

14. The combination with a plurality of keys, of strikers for said keys, and a plurality of bell cranks supporting said strikers and having a common axis of rotation, said bell cranks being jointed so as to permit movements of said strikers other than those determined by the swinging movements of said bell cranks.

15. The combination with a typewriting machine including keys and a traveling carriage, of an automatic operator for said typewriting machine arranged to reproduce a predetermined piece of typewritten matter, and automatic means controlled from said carriage for bringing into play parts of said automatic operator to return said carriage at the end of a written line.

16. The combination with a typewriting machine including a traveling carriage and a series of keys, of traversing means for returning said carriage, and automatic means coming into play spontaneously in a predetermined zone in the travel of said carriage for starting said carriage-return means in action at the striking of one of said keys.

17. The combination, with a typewriting mechanism, including a traveling paper-carrier, and key-actuated types arranged to strike thereagainst; of a set of actuators for said types; a master-control set for governing the action of said actuators; means for rearwardly traversing said paper-carrier; an actuator controlled automatically from said paper-carrier to bring into action said traversing means at the end of a written line; and an actuator controlled from said paper-carrier for disconnecting said traversing means at a predetermined point in the rearward movement of said paper-carrier.

18. The combination with a typewriting machine including a traveling carriage and a series of keys, of an automatic operator for said typewriting machine, and automatic means controlled from said carriage for automatically traversing said carriage at a predetermined point in a series of typewriting actions as accomplished by said operator, said automatic means having an adjustable member to vary the instant of coming into play of said automatic means.

19. The combination with a typewriting machine including a traveling carriage and a series of keys among which is a space key, of carriage-traversing means for returning said carriage, and automatic means operable by said space key to bring into play said carriage-traversing means to return said carriage.

20. The combination with a typewriting machine including a traveling carriage and a series of keys among which is a space key, of carriage-traversing means for returning said carriage, and automatic carriage-controlled means brought into play at a given zone in the travel of said carriage to enable said space key to bring into play said carriage-traversing means to return said carriage at the striking of said space key in a given zone in the travel of said carriage.

21. The combination with a typewriting machine including a traveling carriage and a series of keys among which is a space key, of carriage-traversing means for returning said carriage, and automatic carriage-controlled means brought into play at a given zone in the travel of said carriage to enable said space key to bring into play said carriage-traversing means to return said carriage at the striking of said space key in a given zone in the travel of said carriage, said automatic means having parts adjustable to vary the zone in which said carriage-traversing means may be brought into play automatically by an actuation of said space key.

22. The combination with a typewriting machine including a traveling carriage and a series of keys among which is a space key, of carriage-traversing means, controlling means for said carriage-traversing means, a tripper for said controlling means, and means operated from said carriage for rendering said tripper subservient to said space key so that the actuation of said space key may bring into play said carriage-traversing means.

23. The combination with a typewriting machine including a traveling carriage and a series of keys among which is a space key, of carriage-traversing means, controlling means for said carriage-traversing means, a tripper for said controlling means, a lever for shifting said tripper to a position subservient to said space key, a rod for actuating said lever, a stop on said rod, and a contact on said carriage engaging said stop to shift said rod and rock said lever.

24. The combination with a typewriting machine including a traveling carriage and a series of keys among which is a space key, of carriage-traversing means, controlling means for said carriage-traversing means, a tripper for said controlling means, a lever for shifting said tripper to a position subservient to said space key, a rod for actuating said lever, a stop on said rod, a contact on said carriage engaging said stop to shift said rod and rock said lever, and means for adjusting the position of said stop so as to vary the instant of engagement of said contact with said stop.

25. The combination with a typewriting machine including a traveling carriage and a series of keys, one of which is a space key, of traversing means for said carriage, an actuator for bringing into play said traversing means, a control valve for said actuator, a tripper for said control valve, said tripper being normally free and clear of said space key, a lever for shifting said tripper to a position to be actuated by said space key, and means controlled from said carriage for operating said lever to shift said tripper within the sphere of operation of said space key during a zone of several letter spaces at the end of a line whereby if said space key is actuated in this zone, said carriage will be returned.

26. The combination with a typewriting machine including a traveling carriage and a series of keys among which are a space key and a hyphen key, of carriage-traversing means, controlling means for said carriage-traversing means, a tripper for said controlling means normally free and clear of said space key, means controlled from said carriage for rendering said tripper subservient to said space key, so as to bring into play said carriage-traversing means, and connections rendering said space key subservient to said hyphen key whereby an actuation of said hyphen key may bring into play said carriage-traversing means.

27. The combination with a typewriting machine including a traveling carriage and a plurality of keys among which is a hyphen key, of carriage-traversing means, and connections controlling said carriage-traversing means from said hyphen key whereby the major traveling movement of said carriage may be effected at an actuation of said hyphen key.

28. The combination with a typewriting machine including a traveling carriage and a hyphen key, of automatic means for causing an actuation of said hyphen key controlled from said carriage.

29. The combination with a typewriting machine including a carriage traveling to determine a written line and a hyphen key, of automatic means causing a striking of said hyphen key at the last letter space in a line.

30. The combination with a typewriting machine including a carriage traveling to determine a written line and a hyphen key, of automatic means causing a striking of said hyphen key at the last letter space in a line, and automatic means for returning said carriage controlled from said hyphen key.

31. The combination with a typewriting machine including a traveling carriage and a series of keys, one of which is a hyphen key, of actuating mechanism for said hyphen key, and automatic mechanism for tripping said actuating mechanism into operation as the carriage approaches the end of a written line.

32. The combination with a typewriting machine including a traveling carriage and a series of keys, one of which is a hyphen key, of automatic means for successively striking the hyphen key and returning the carriage as the carriage approaches the end of a written line.

33. The combination with a typewriting machine including a traveling carriage and a plurality of keys, one of which is a hyphen key, of an automatic actuator for said hyphen key, a valve for controlling said automatic actuator, and means for tripping said valve from said carriage.

34. The combination with a typewriting machine including a traveling carriage and a plurality of keys, one of which is a hyphen key, of an automatic actuator for said hyphen key, a valve for controlling said actuator, a tripper for said valve, a lever for operating said tripper, and means for operating said lever from said carriage.

35. The combination with a typewriting machine including a traveling carriage and a plurality of keys, one of which is a hyphen key, of an automatic actuator for said hyphen key, a valve for controlling said actuator, a tripper for said valve, a lever for operating said tripper, and means for operating said lever from said carriage, said means having parts adjustable to vary the extent of operation of said lever from said carriage.

36. The combination with a key-actuated machine, of an automatic operator for said machine including a plurality of actuators, said actuators shifting so as to operate individually first one and then another of said keys.

37. The combination with a typewriting machine including a plurality of keys, of an automatic operator for said typewriting machine including a plurality of actuators, said actuators being shiftable selectively so that each actuator may selectively operate any one of a number of keys.

38. The combination with a typewriting machine including a plurality of printing keys and a traveling carriage, of automatic means enabling said carriage to control the operation of one of said printing keys, and such printing key in turn controlling the return movement of said carriage.

39. The combination, with a typewriting machine including a traveling carriage and a series of keys, among which is a space key; of carriage-traversing means; controlling means for said traversing means, a tripper for said controlling means to bring said traversing means into play, said tripper adapted to be operated by said space key, but normally in ineffective position for such operation; and means operated from said carriage for shifting said tripper into effective position for said operation.

40. The combination, with a typewriting machine including a traveling carriage and a series of keys, among which is a space key; of carriage-traversing means; controlling means for said traversing means; a tripper for said controlling means to bring said traversing means into play, said tripper adapted to be operated by said space key, but normally in ineffective position for such operation; and means for automatically shifting said tripper into effective position for said operation when said carriage reaches a predetermined zone in its travel.

41. The combination, with a typewriting machine including a traveling carriage and a series of keys, among which is a space key; of carriage-traversing means; controlling means for said traversing means; a tripper for said controlling means movable to a position beneath said space key, so as to permit it to be operated thereby, but normally clear of such position; and means for automatically shifting said tripper into said position when said carriage reaches a predetermined zone in its travel.

42. The combination, with a typewriting machine including a traveling carriage and a series of keys comprising both printing and non-printing keys; of carriage-traversing means; controlling means for said traversing means; a tripper for said controlling means to bring said traversing means into play, said tripper operable by one of said non-printing keys, but normally ineffective for such operation; and means operated from said carriage for rendering said tripper effective for said operation.

43. The combination, with a typewriting machine including a traveling carriage and a series of keys comprising both printing and non-printing keys; of carriage-traversing means; controlling means for said traversing means; a tripper for said controlling means to bring said traversing means into play, said tripper operable by one of said non-printing keys, but normally ineffective for such operation; and means for automatically rendering said tripper effective for said operation when said carriage reaches a predetermined zone in its travel.

44. The combination, with a carriage, and traversing means for returning it; of a series of keys, including both printing and non-printing keys; controlling means for said traversing means operated by one of the non-printing keys; a tripper for said controlling means, to bring said traversing means into action; means operated from said carriage for rendering said tripper subservient to said non-printing key; a lock for maintaining said traversing means in action; and means for releasing said lock from said carriage.

45. The combination, with a carriage, and traversing means for returning it; of a series of keys, including both printing and non-printing keys; controlling means for said traversing means operated by one of the non-printing keys; a tripper for said controlling means, to bring said traversing means into action; means operated from said carriage for rendering said tripper subservient to said non-printing key; a lock for maintaining said traversing means in action; and a tripper for said lock controlled from said carriage.

46. The combination, with a group of keys; of a striker for operating all of said keys; and a pair of balanced actuators acting to normally hold said striker in position to operate one key of the group, but arranged to be brought into play alternatively to shift said striker into position to operate one or another of the remaining keys.

47. The combination, with a group of keys; of a striker for operating all of said keys; a pair of balanced actuators acting to normally hold said striker in position to operate one key of the group, but arranged to be brought into play alternatively to shift said striker into position to operate one or another of the remaining keys; an actuator for operating said striker in any one of its several positions; and master-sheet-controlled mechanism for governing the activity of all of said actuators.

48. The combination, with a pair of keys; of a striker for operating both keys; a pair of actuators for said striker disposed on opposite sides thereof and connected together and to said striker, so as to be normally balanced and to normally hold the striker in an intermediate position with relation to said keys, said actuators being arranged to be brought into play alternatively, so as to shift said striker into position to operate either key; an actuator for operating said striker in either one of its positions; and master-sheet-controlled mechanism for governing the activity of all of said actuators.

49. The combination, with a group of keys; of an actuator for operating all of said keys comprising a swinging section having an independent selecting movement to determine the particular key to be operated; and a pair of balanced actuators acting to normally hold said section in position to operate one key of the group, but brought into play alternatively to shift said section into position to operate one or another of the remaining keys.

50. The combination, with a group of keys; of an actuator for operating all of said keys comprising a section having an independent swinging movement sidewise in either direction to determine the particular key to be operated; and a pair of balanced actuators disposed on opposite sides of said section and connected thereto and to each other, so as to normally hold said section in an intermediate position, said balanced actuators being arranged to be brought into play alternatively, so as to shift said section into position to actuate one or another of said keys.

51. The combination, with a group of keys; of a bell crank for operating all of said keys, one arm of which comprises an independently-movable selecting section for determining the particular key to be operated; a pair of balanced selecting actuators acting to normally hold said section in one position, but brought into play alternatively to shift said section into different positions; and a separate, operating actuator connected to the other arm of said bell crank.

52. The combination, with a typewriting mechanism including a traveling carriage, printing keys, and a non-printing key, the non-printing key being operable both by and independently of one of the printing keys; means operated automatically by the actuation of said non-printing key for returning the carriage; and automatic means for actuating said printing key as said carriage approaches the end of a written line.

53. The combination, with a typewriting mechanism including a traveling carriage, a hyphen-printing key, and a space key, said space key being operable both by and independently of said hyphen key; means operated automatically by the actuation of said space key for returning the carriage; and automatic means for actuating said hyphen key as said carriage approaches the end of a written line.

54. The combination, with a typewriting mechanism including a traveling carriage, printing keys, and a space key, said space key being operable both by and independently of one of said printing keys; means operated automatically by the actuation of said space key for returning the carriage; and automatic means for actuating said printing key as said carriage approaches the end of a written line.

55. The combination, with a typewriting mechanism including a traveling carriage, a hyphen-printing key, and a non-printing key, said non-printing key being operable both by and independently of said hyphen key; means operated automatically by the actuation of said non-printing key for returning the carriage; and automatic means for actuating said hyphen key as said carriage approaches the end of a written line.

LYMAN R. ROBERTS.

Witnesses:
W. O. WESTPHAL,
E. A. RENNIE.